United States Patent [19]
Puls

[11] Patent Number: 5,441,378
[45] Date of Patent: Aug. 15, 1995

[54] SNOWMOBILE LIFT DOLLY

[76] Inventor: Craig Puls, 3466 Lovers La., Slinger, Wis. 53086

[21] Appl. No.: 144,278

[22] Filed: Oct. 28, 1993

[51] Int. Cl.⁶ ............................................. B62B 3/10
[52] U.S. Cl. ................................ 414/458; 254/8 R
[58] Field of Search ............ 414/458, 461, 482, 483, 414/495, 436, 471, 743, 785; 280/8, 13, 47.35, 62, 79.7; 254/8 R, 8 C, 120, 131

[56] References Cited

U.S. PATENT DOCUMENTS

| | | | |
|---|---|---|---|
| 2,851,247 | 9/1958 | Hilding | 254/8 B |
| 3,647,237 | 3/1972 | Milton | 254/8 R |
| 3,658,200 | 4/1972 | Chaplinski | 414/458 X |
| 3,667,728 | 6/1972 | Garelick | 414/458 X |
| 3,807,593 | 4/1974 | Bourton | 414/483 X |
| 3,860,078 | 1/1975 | Stoick | 254/8 R |
| 3,876,096 | 4/1975 | Latek | 254/8 R X |
| 3,941,264 | 3/1976 | da Silva Bento | 414/458 |
| 3,990,593 | 11/1976 | Guger | 414/458 |
| 4,051,967 | 10/1977 | Sedgwick et al. | 254/131 |
| 4,324,384 | 4/1982 | Elser | 254/131 |
| 4,659,100 | 4/1987 | Welker | 414/483 X |
| 4,902,191 | 2/1990 | Cumbest et al. | 254/8 R X |
| 4,944,648 | 7/1990 | Parr | 414/492 X |
| 5,114,118 | 5/1992 | Schrader | 254/8 R |
| 5,143,352 | 9/1992 | Latimer | 254/131 |
| 5,232,203 | 8/1993 | Butts | 254/8 R |

*Primary Examiner*—Michael S. Huppert
*Assistant Examiner*—James W. Keenan
*Attorney, Agent, or Firm*—Ryan, Kees & Hohenfeldt

[57] ABSTRACT

A dolly which can be easily placed under a snowmobile, to lift the front end of the snowmobile for easy movement and storage. The dolly includes a support frame, rollably supported on casters. A lift lever is pivotably attached to the support frame. A contact pad is mounted to a lift end of the lift lever, for contacting the underside of the snowmobile. The lift lever can move the contact pad between two positions, a raised position and a lowered position. The lift lever includes a latch for latching the lever with the contact pad in the raised position. An extension lever is removably attached to a lever end of the lift lever, to give additional leverage for lifting the snowmobile. Various embodiments are disclosed to accommodate structural differences among various makes and models of snowmobiles.

15 Claims, 4 Drawing Sheets

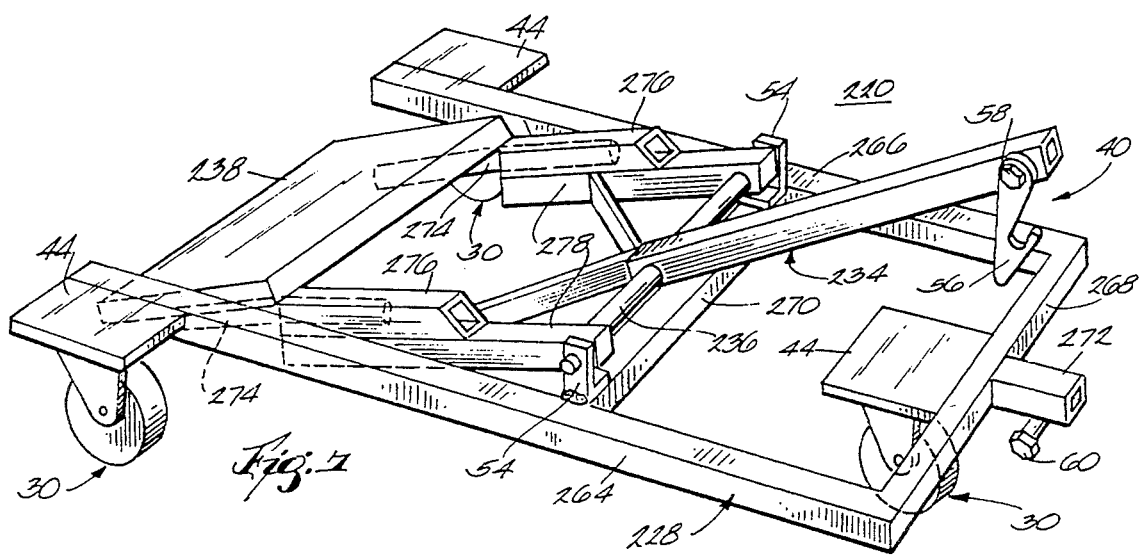
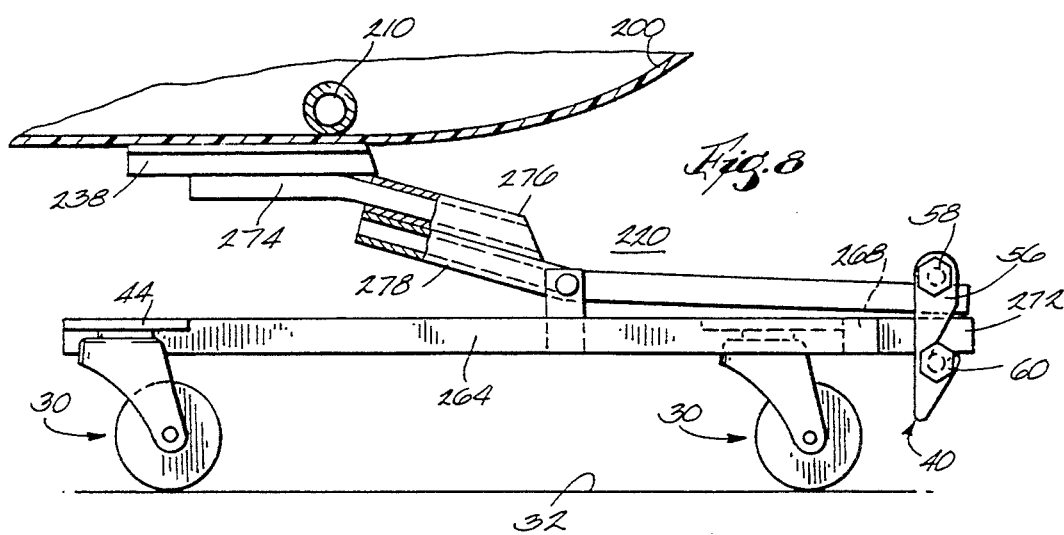
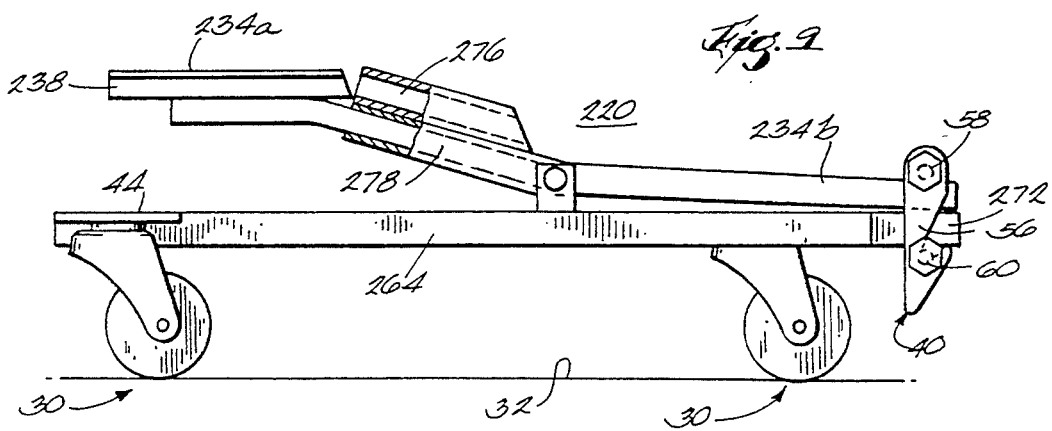

SNOWMOBILE LIFT DOLLY

BACKGROUND OF THE INVENTION

This invention relates to accessories for snowmobiles, and in particular to lift dollies for lifting the front end of the snowmobile off the ground, such as for easy moving where there is no snow, and for improved storage.

Especially in the northern tier of states, snowmobiles are very popular as a means of transportation as well as a means of entertainment or recreation. Since snowmobiles are seasonal, however, storage is usually necessary in a place where there is no snow, such as in the owner's garage. There is a need for easy movement of the snowmobile in the garage during those storage periods. It is also desirable from the standpoint of a dealer to be able to easily move snowmobiles from one spot in a showroom to another. In this case also there is generally no snow available, and in both cases the movement has been a manual and difficult operation.

Further, it is important that the skis be lifted off the ground during storage, so as to reduce corrosion. There are some owners who lift the snowmobile off the ground and place it on blocks, but due to the weight of modern snowmobiles, not everyone is capable of the lifting necessary for storing snowmobiles in this manner.

This invention relates to improvements over the apparatus set forth above and to solutions to the problems raised or not solved thereby.

SUMMARY OF THE INVENTION

The invention relates to a dolly which can be easily placed under a snowmobile, to lift the front end of the snowmobile for easy movement and storage.

There are four major manufacturers of snowmobiles sold in the United States, Ski-Doo, Polaris, Arctic Cat and Yamaha, in no particular order. As might be expected, there are structural differences from one manufacturer to another, and so the identical lift will not work on all makes and models. Accordingly, it is an object of this invention to provide lifts which work the same in principle for all makes and models of snowmobiles, with embodiments different only in detail applied to the various different types.

The snowmobile dolly provided by this invention includes a support frame, and at least three wheels or casters for rollably supporting the support frame on a floor or other surface. A lift lever is pivotably attached to the support frame between the two ends of the lift lever. A contact pad is mounted to one end of the lift lever, for contacting the underside of the snowmobile. The lift lever can move the contact pad between two positions, a raised position and a lowered position. The lift lever includes a latch for latching the lever with the contact pad in the raised position. An extension handle is removably attached to the lift lever at the end opposite to where the contact pad is mounted, to give additional leverage for lifting the snowmobile. In one embodiment, the portion of the lift lever having the contact pad has two forks, with one of the two forks supporting each end of the contact pad, for contacting the underside of the snowmobile. In another embodiment, the portion of the lift lever having the contact pad has two forks, each having a separate contact pad attached thereto, for contacting the two separated load-bearing areas of some models of snowmobile. In a third embodiment, the portion of the lift lever having the contact pad is forked, and has a pair of openings to removably receive a pair of rods affixed to a large, flat contact pad. This type of contact pad is appropriate for supporting snowmobiles having transverse bars on their undersides for bearing the weight of the snowmobile when lifted. Additional pairs of openings may also be provided in this embodiment to receive the contact pad rods in one of several positions, so that the contact pad may be supported at several different levels, thereby accommodating different suspension settings in snowmobiles.

In the preferred embodiment, the latch includes a ramped hook pivotably attached to the end of the lift lever where the lever handle extension attaches, and a peg attached at an appropriate location on the support frame. The ramped hook coacts with the peg to automatically latch the lift lever to the support frame, thereby latching the contact pad in the raised position, and supporting the snowmobile with its skis off the ground.

Other objects and advantages of the invention will become apparent hereinafter.

DESCRIPTION OF THE DRAWING

FIG. 7 is a perspective view of a snowmobile dolly constructed according to another alternative embodiment of the invention.

FIG. 8 is a side elevational view of the snowmobile dolly shown in FIG. 7.

FIG. 9 is another side elevational view of the snowmobile dolly shown in FIG. 7, in a different position than that shown in FIG. 8.

DESCRIPTION OF THE PREFERRED EMBODIMENT

Figure 1:
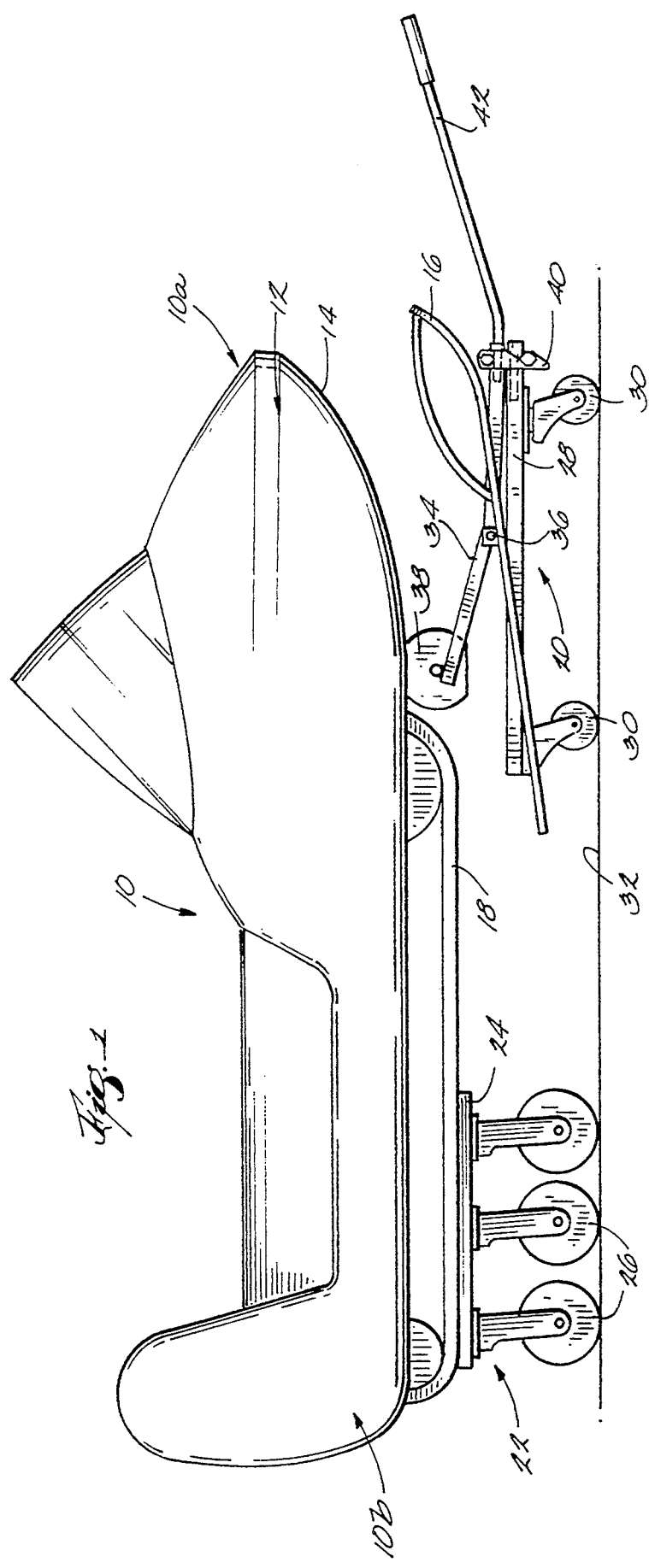
FIG. 1 is a side elevational view of a snowmobile with its front end supported by a dolly constructed according to one embodiment of the invention.

Referring now to FIG. 1, there is shown an entirely conventional snowmobile 10, with an engine area 12 at the front, covered by a cowl 14. The front end 10a of the snowmobile 10 has skis 16 for supporting the front end in normal operation. The back end 10b of the snowmobile 10 is supported by a drive track 18, which is connected eventually to and driven by the engine, not shown, inside the engine area 12.

The invention provides a dolly 20 for supporting the front end 10a of the snowmobile 10. The back end 10b of the snowmobile 10 may also be supported by any suitable castered dolly, such as the rear dolly 22 shown in FIG. 1. The rear dolly 22 shown in FIG. 1 has a flat top 24 and includes at least three casters 26, or swivelable wheels, attached underneath the flat top, for automatic stability.

In general terms, all embodiments of the invention include the parts described in the following, and operate as described as follows. The front dolly 20 includes a support frame 28 and a set of casters 30 for rollably supporting the support frame on a floor or other surface 32. A lift lever 34 is pivotably attached to the support frame 28 at a pivot axle 36. Pivot axle 36 is located between the ends of both the support frame 28 and the lift lever 34. A contact pad 38 is mounted to one end of the lift lever 34, for contacting the underside of the snowmobile 10. A latch 40 is provided for latching the lift lever 34 with the contact pad 38 in a raised position, as shown in FIG. 1.

A lever extension handle 42 is removably attached to the lift lever 34 at the end opposite to where the contact pad 38 is mounted. This lever extension handle 42 gives the user sufficient leverage to easily lift the snowmobile front end 10a so that the latch 40 can be closed. Once the latch 40 is closed, the handle 42 may be removed, so that the remaining apparatus does not take up substantially more floor area than the snowmobile without the dolly. Handle 42 may be attached by any suitable easily removable structure. As shown in FIG. 1, the handle 42 is slid telescopically into the end of the lift lever 34, which is open to accept the handle.

Figure 2:
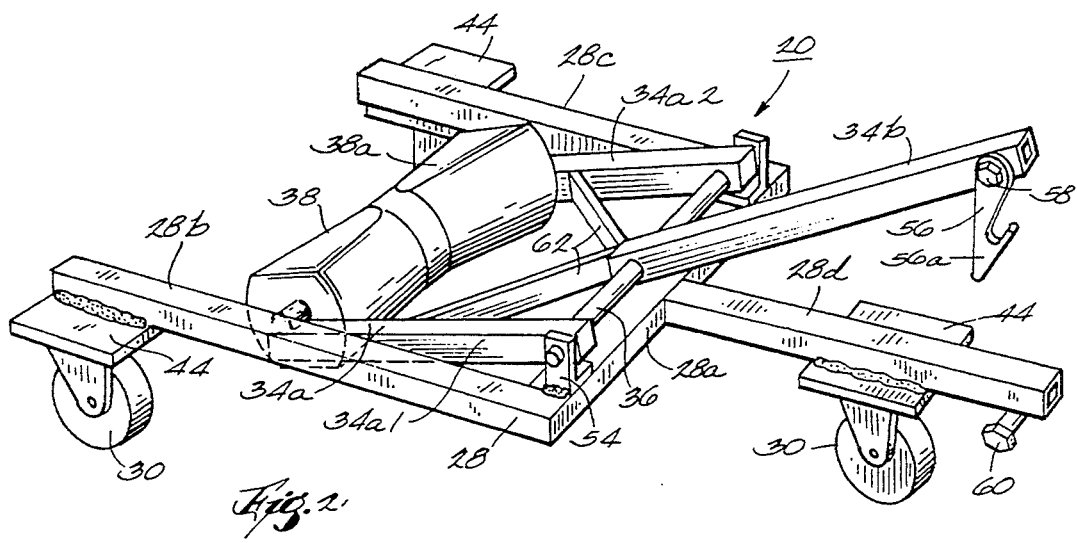
FIG. 2 is a perspective view of the snowmobile dolly shown in FIG. 1.
Figure 3:
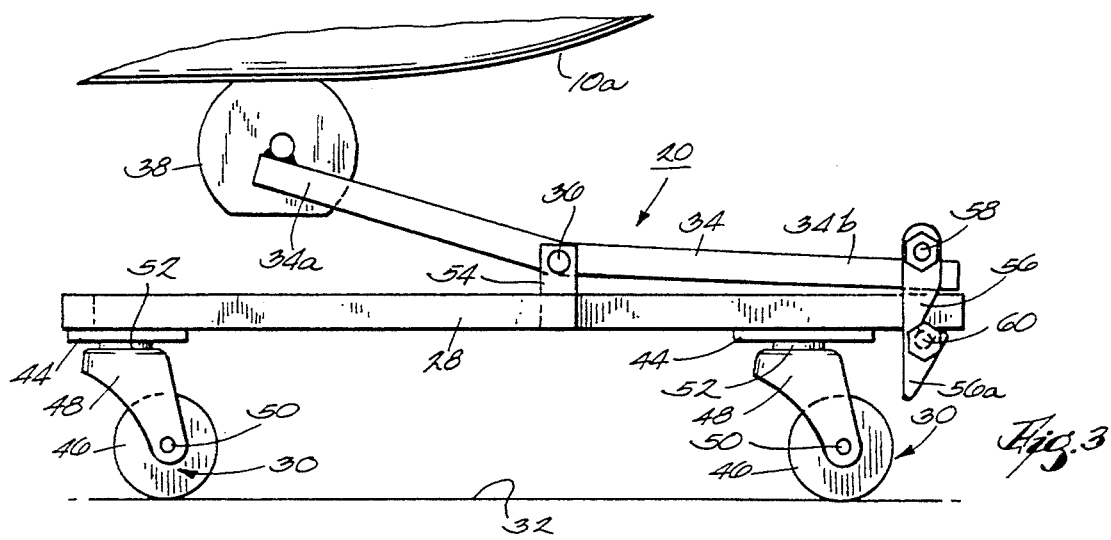
FIG. 3 is a side elevational view of the snowmobile dolly shown in FIG. 1.
Figure 4:
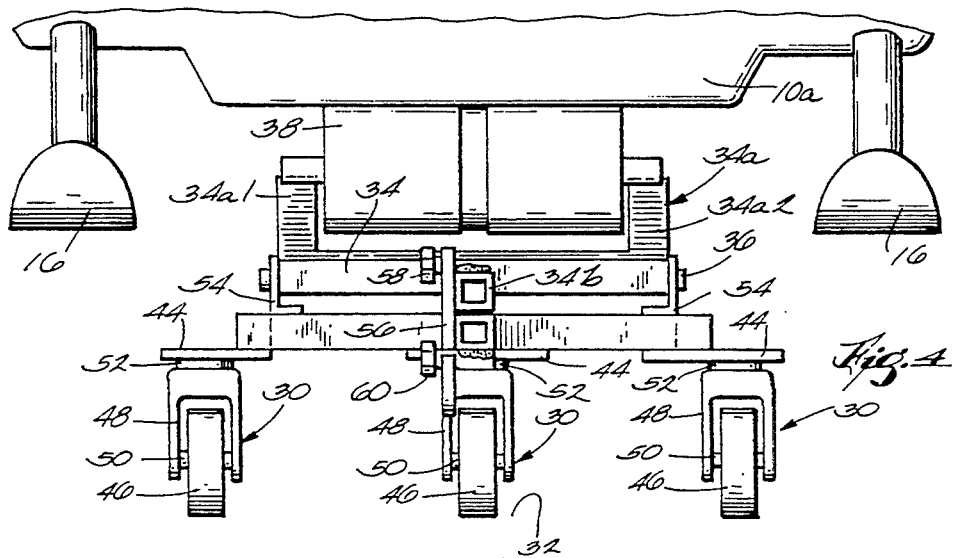
FIG. 4 is an end elevational view of the snowmobile dolly shown in FIG. 3, taken from the right end.

The particular embodiment of front dolly 20 shown in FIG. 1 is shown in more detail in FIGS. 2, 3 and 4. This embodiment works well with Polaris and Ski-Doo brand snowmobiles. As shown in those figures, a dolly constructed according to this embodiment of the invention includes a support frame 28, which in this case is in a somewhat squared-Y shape. That is, support frame 28 includes a cross bar 28a, with twin branch members 28b, 28c attached one at each end of the cross bar and both extending to one side of and substantially orthogonal to the cross bar, and a single branch 28d affixed about-at the middle of the cross bar and extending to the opposite side of and substantially orthogonal to the cross bar. Near each of the ends of the three branches 28b, 28c, 28d is affixed, by any suitable means, such as welding, a caster plate 44. To each caster plate 44 is affixed one of the three casters 30 (one of which is seen only in FIG. 4). As shown best in FIGS. 3 and 4, each caster 30 includes a wheel 46 journaled to a bracket 48 by means of an axle 50, which in turn is swivelably attached to a mounting plate 52, non-movably affixed to the respective caster plate 44. Three was selected as the preferred number of casters 30 because use of two casters is of course inherently unstable, and use of four or more casters results in rocking when on a surface which is the least bit uneven.

A set of pivot brackets 54 are positioned on the frame 28, somewhere between the ends thereof as viewed from the side, such as in FIG. 3. The most preferable positioning of the pivot brackets 54 is near the middle of the length of the frame 28, such as at opposite ends of the cross bar 28a. Pivotably attached to the pivot brackets is pivot axle 36. Lift lever 34 pivots on pivot axle 36, and the pivot axle may form a part of the lift lever. One end of lift lever 34, lifting end 34a, has a contact pad 38 attached thereto. In this embodiment, the contact pad 38 is a single pad, mounted between two forks 34a1 and 34a2 of the lifting end 34a of the lift lever 34. While any suitable contact pad could be used, the contact pad 38 shown in FIGS. 2, 3 and 4 is a rounded pad, with a flat surface 38a for stable support of the underside of the snowmobile 10 (FIG. 3).

The opposite end of the lifting lever 34, the lever end 34b, has a latch 40. While any suitable easily openable latch would work, the latch 40 shown includes a ramped hook 56 freely rotatably attached to the lever end 34b of lifting lever 34, such as by a bolt 58, so that it hangs substantially vertically downward. By the term "ramped hook" is meant a hook with a leading edge having a ramped or angled surface 56a. The bolt 58 is positioned on the lever end 34b so that, as the lever end is lowered, the ramp portion 56a of the hook 56 first contacts a latch bolt 60, attached to the single branch 28d. As the lever end 34b continues to be lowered, raising the contact pad 38, and the point of the hook 56 approaches the latch bolt 60, the hook pivots away from the vertical. Then, once the point of the hook 56 passes the latch bolt 60, the hook swings back to the vertical, and the lever end 34b is engaged with the latch bolt, holding the contact pad 38 in a raised position. The lever end 34b may be easily disengaged from the latch bolt 60 manually and, with the lift end 34a being somewhat heavier than the lever end, the lever end will then rise until the lift end comes to rest in a lowered position. Generally, for ease of use, the angle between the lift end 34a and the lever end 34b is preferred to be slightly less than 180°, in the area of about 160° to 170°. As also shown in FIG. 2, reinforcing struts 62 may be provided as part of lift end 34a, to provide further strength to the overall structure in lifting the snowmobile 10.

It will be noted that, as shown in FIG. 4, in that embodiment the contact pad 38 contacts the underside of the snowmobile 10 about in the center, at a pan 10a provided for that purpose in certain snowmobiles, particularly those manufactured by Polaris and Ski-Doo. Some snowmobiles, though, such as those manufactured by Yamaha, have no such centrally located pan by which the snowmobile can be supported. Rather, referring now to FIGS. 5 and 6, these snowmobiles 100 have side areas 110, 112 at the sides of the front underside which are designed for such support, and a false pan 114 at the center which is not suitable for supporting any substantial weight.

Figure 5:
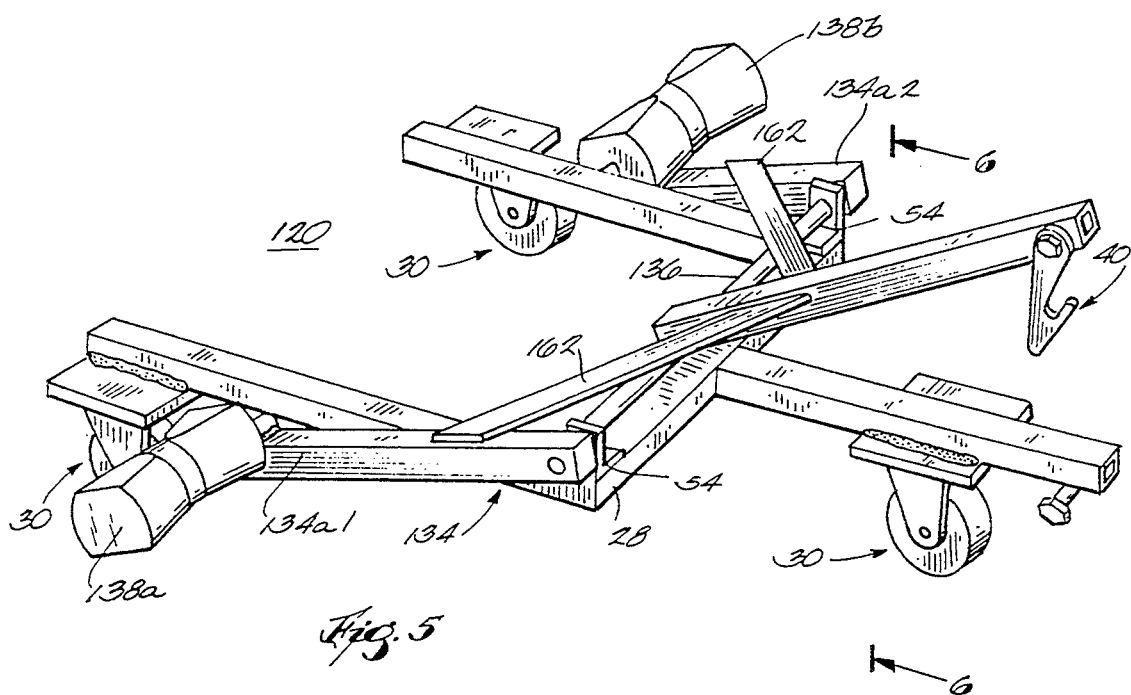
FIG. 5 is a perspective view of a snowmobile dolly constructed according to an alternative embodiment of the invention.
Figure 6:
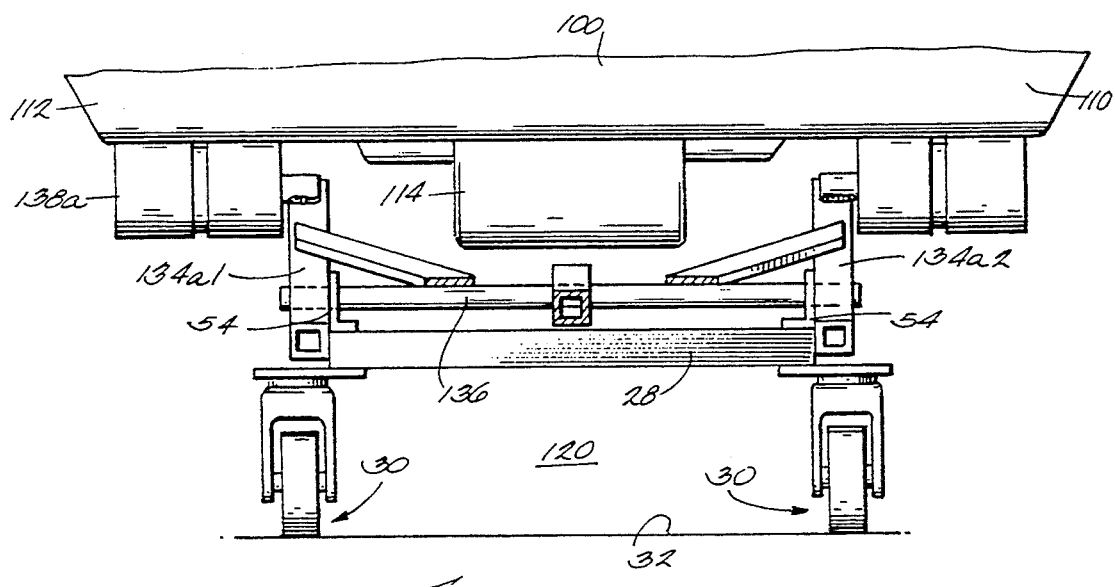
FIG. 6 is a cross-sectional view of the snowmobile dolly shown in FIG. 5, taken generally along line 6—6 thereof.

Accordingly, the embodiment of the invention shown in FIGS. 5 and 6 is a dolly 120 provided with the same squared-Y shape frame 28, the same casters 30 and the same latch 40 as the embodiment shown in FIGS. 2, 3 and 4. This embodiment is provided with a lift lever 134, mounted to frame 28 to pivot on a pivot axle 136, which rotatably passes through pivot brackets 54 on the cross bar 28a of the frame. This embodiment includes two contact pads 138a, 138b, each attached to the end of a respective one of a pair of forks 134a1, 134a2 of the lift lever 134. Thus, as can be seen in FIG. 6, the snowmobile 10 is supported at the side areas 110, 112, rather than by the false pan 114 in the center. Reinforcing struts 162 may be provided as part of lift end 134a, to provide further strength to the overall structure in lifting the snowmobile 100.

Referring now to FIGS. 7, 8 and 9, other manufacturers of snowmobiles, including Arctic Cat, provide a transverse bar 210 inside the undersides of their snowmobiles 200 for bearing the weight of the snowmobile when lifted. Both the single pad 38 shown in FIGS. 1 through 4 and the split pads shown in FIGS. 5 and 6 have disadvantages in lifting a snowmobile by this transverse bar 210. Further, the position of this transverse bar 210 is lower on some snowmobiles than that of the flat undersides of the snowmobiles 10 and 100 shown in the earlier-described embodiments, depending on how the suspension of the snowmobile is set.

Accordingly, the invention provides the embodiment shown in FIGS. 7, 8 and 9. According to the invention, a dolly 220 as shown there includes the same casters 30 attached to the same caster plates 44. As can be seen by comparing the dollies 20, 120 shown in FIGS. 1 through 6 with the dolly 220 shown in FIGS. 7 through 9, though, in this embodiment the caster plates 44 are affixed to the sides of a frame 228, rather than the frame being affixed to the top surfaces of the plates. This manner of attachment lowers the frame 228 toward the floor or other supporting surface 32, enabling the dolly 220 to fit under snowmobiles with lower clearances. Frame 228 is substantially rectangular in shape, with two longitudinal side bars 264, 266 running the length of the frame, an end cross bar 268 affixing together respective ends of each of the side bars, and a central cross bar 270 affixed between the side bars near the center of the length of the side bars. In this embodiment two caster plates 44 are affixed one to each of the side bars 264, 266 at one end thereof, and a third caster plate 44 is affixed to the end cross bar 268, about at the center thereof.

Pivot brackets 54 are affixed in the central area of the side bars 264, 266, such as at opposite ends of the central cross bar 270. Once again a lift lever 234 pivots by means of a pivot axle 236 in the pivot brackets 54. And again lift lever 234 includes a lift end 234a and a lever end 234b. Also, lever end 234b includes a latch, 40, including a ramped hook 56 freely rotatably attached to the lever end 234b of lifting lever 234, by a bolt 58, and a latch bolt 60, attached in this case to a stub 272 attached to end cross bar 268 for that purpose.

In this embodiment the lift end 234a of lift lever 234 has mounted thereto a contact pad 238 that is substantially flat and rectangular. Contact pad 238 is supported by two support posts 274 spaced widely apart beneath the contact pad. Each of the support posts 274 has an end that extends beyond the edge of the contact pad 238. The lift end 234a of lift lever 234 includes a pair of receiving tubes 276, sized and spaced to receive the support posts 274 of the contact pad 238. Thus the flat contact pad 238 permits the dolly 220 to provide a flat surface by which to bear the weight of the snowmobile 200 via the transverse bar 210.

The invention also provides the additional feature that the contact pad 238 may be positioned at different levels, to accommodate the different clearances of different snowmobile makes, or different suspension settings within the same make. This feature is accomplished by the embodiment shown in FIGS. 7 through 9 by the provision of additional sets 278 of receiving tubes, positioned immediately below (as shown in the figures) or above the other receiving tubes 276. As can be seen best by comparing FIG. 8 and FIG. 9, this feature permits the positioning of the contact pad 238 at a higher level for some uses and, even more important, permits the positioning of the contact pad at a lower level, when the suspension is set so low that the other embodiments could not be inserted thereunder.

Another advantage of the invention, which is not apparent on first consideration, is the weight reduction of the rear end 10b of the snowmobile 10 when the front end 10a is lifted off the surface 32 by a dolly 20, 120, 220 according to the invention. That is, generally the heaviest single part of a snowmobile (with the rider dismounted) is the engine. With the dolly 20, 120, 220 having lifted the front end beneath the engine, the center of gravity of the snowmobile is so close to the dolly that up to forty percent or more of the weight formerly on the rear end 10b is also removed. This feature makes it much easier to lift the rear end onto the rear dolly 22, once the front end is on the front dolly 20, 120, 220.

While the apparatus hereinbefore described is effectively adapted to fulfill the aforesaid objects, it is to be understood that the invention is not intended to be limited to the specific preferred embodiment of snowmobile lift dolly set forth above. Rather, it is to be taken as including all reasonable equivalents to the subject matter of the appended claims.

I claim:

1. A snowmobile dolly for supporting the front of a snowmobile having two skis mounted thereto, said dolly comprising:
   a support frame;
   at least three wheels for rollably supporting the support frame on a floor or other surface;
   a lift lever, having two ends, pivotably attached to the support frame, the pivotable attachment of the lift lever being between the two ends of the lift lever;
   a contact pad mounted to one end of the lift lever, specifically shaped and sized for fitting between the skis and for contacting the underside of the snowmobile, said lift lever having at least two positions to which the lift lever can move the contact pad, a raised position and a lowered position, and
   a latch for latching the lever with the contact pad in the raised position.

2. A snowmobile dolly as recited in claim 1 wherein said at least three wheels are caster wheels.

3. A snowmobile dolly as recited in claim 1 wherein said support frame is elongated, with two ends, and wherein at least two of said at least three wheels are mounted at one end of the support frame and at least one of said at least three wheels is mounted at the other end of the support frame.

4. A snowmobile dolly as recited in claim 3 wherein said lift lever is pivotably attached to the support frame at a point on the support frame between the ends of the support frame.

5. A snowmobile dolly as recited in claim 1 further comprising an extension lever removably attached to the lift lever at the end opposite to where the contact pad is mounted.

6. A snowmobile dolly as recited in claim 5 wherein the latch includes a ramped hook pivotably attached to the end of the lift lever where the extension lever attaches, said ramped hook coacting with a peg attached at an appropriate location on the support frame to automatically latch the lift lever to the support frame.

7. A snowmobile dolly as recited in claim 1 wherein the portion of the lift lever having the contact pad is forked, and has a pair of openings to removably receive a pair of rods affixed to the contact pad itself.

8. A snowmobile dolly as recited in claim 7 wherein the openings telescopically receive the rods.

9. A snowmobile dolly as recited in claim 1 wherein the portion of the lift lever having the contact pad is forked, and has two pairs of openings to removably receive a pair of rods affixed to the contact pad itself in either of two positions, a higher position and a lower position.

10. A snowmobile dolly as recited in claim 9 wherein the openings telescopically receive the rods.

11. A snowmobile dolly for supporting the front end of a snowmobile, having skis, above a floor or other supporting surface, the dolly comprising:
- a generally Y-shaped frame;
- a caster mounted at each of the three branches of the Y-shape of the frame;
- a lift lever pivotably mounted to the frame, the lift lever having a contact pad at one end thereof shaded and sized specifically for fitting between the skis and for contacting the underside of the front of the snowmobile, and an attachment for a lever handle at the other end thereof, with the pivot point of the lift lever being located between the two ends; and
- a latch for latching the lever in a position where the end having the contact pad is pivoted upward and the end having the handle attachment is pivoted downward.

12. A snowmobile dolly as recited in claim 11 wherein the portion of the lift lever having the contact pad has two forks, with one of the two forks supporting each end of the contact pad.

13. A snowmobile dolly as recited in claim 11 wherein the latch includes a ramped hook pivotably attached to the end of the lift lever where the lever handle attaches, and a peg attached at an appropriate location on the Y-shaped frame, said ramped hook co-acting with said peg to automatically latch the lift lever to the Y-shaped frame.

14. Apparatus for supporting a snowmobile with its skis and track off a floor or other supporting surface, the apparatus comprising:
- a front dolly for rollably supporting the front of the snowmobile with its skis off the floor, said front dolly including:
  - a generally Y-shaped frame;
  - a caster mounted at each of the three branches of the Y-shape of the frame;
  - a lift lever pivotably mounted to the frame, the lift lever having a contact pad at one end thereof, said contact pad specifically shaped and sized to fit between the skis and for contacting the underside of the front of the snowmobile, and an attachment for a lever handle at the other end thereof, with the pivot point of the lift lever being located between the two ends; and
  - a latch for latching the lever in a position where the end having the contact pad is pivoted upward and the end having the handle attachment is pivoted downward;
- and a rear dolly having a flat upper supporting surface and at least three casters affixed to the underside thereof, for rollably supporting the snowmobile track off the floor.

15. A snowmobile dolly as recited in claim 11 wherein the portion of the lift lever having the contact pad has two forks, each having a separate contact pad attached thereto, both arranged to contact the underside of the snowmobile between the skis outside of a false pan at the center of the snowmobile.

* * * * *